US008485806B2

(12) United States Patent
Takagi et al.

(10) Patent No.: US 8,485,806 B2
(45) Date of Patent: Jul. 16, 2013

(54) TIRE VULCANIZING DEVICE

(75) Inventors: Chikara Takagi, Hashima (JP); Tatsumi Tanaka, Hashima (JP); Ryuichi Nakagawa, Hashima (JP)

(73) Assignees: Fuji Shoji Co., Ltd., Hashima-shi (JP); Fuji Seiko Co., Ltd., Hashima-shi (JP)

( * ) Notice: Subject to any disclaimer, the term of this patent is extended or adjusted under 35 U.S.C. 154(b) by 0 days.

(21) Appl. No.: 13/520,466

(22) PCT Filed: Dec. 24, 2010

(86) PCT No.: PCT/JP2010/073309
§ 371 (c)(1),
(2), (4) Date: Jul. 3, 2012

(87) PCT Pub. No.: WO2011/083702
PCT Pub. Date: Jul. 14, 2011

(65) Prior Publication Data
US 2012/0315346 A1 Dec. 13, 2012

(30) Foreign Application Priority Data
Jan. 8, 2010 (JP) .................................. 2010-002935

(51) Int. Cl.
*B29C 33/24* (2006.01)
(52) U.S. Cl.
USPC ............................................. 425/46; 425/47
(58) Field of Classification Search
USPC ............................................. 425/46, 47, 195
See application file for complete search history.

(56) References Cited

U.S. PATENT DOCUMENTS

| | | | | |
|---|---|---|---|---|
| 6,250,901 | B1* | 6/2001 | Nagata | 425/46 |
| 7,001,163 | B2* | 2/2006 | McBride et al. | 425/46 |
| 7,594,804 | B2* | 9/2009 | Yasunaga | 425/46 |
| 7,637,727 | B2* | 12/2009 | Hyodo | 425/46 |
| 7,901,608 | B2 | 3/2011 | Takagi et al. | |
| 8,215,939 | B2 | 7/2012 | Takagi et al. | |
| 2004/0046286 | A1 | 3/2004 | Seko et al. | |
| 2007/0284783 | A1 | 12/2007 | Ohara | |

FOREIGN PATENT DOCUMENTS

| | | |
|---|---|---|
| JP | 60 78711 | 5/1985 |
| JP | 2001 62835 | 3/2001 |
| JP | 2001 62836 | 3/2001 |
| JP | 2003 136532 | 5/2003 |
| JP | 2005 212462 | 8/2005 |
| JP | 2007 62270 | 3/2007 |
| JP | 2007 331163 | 12/2007 |

OTHER PUBLICATIONS

International Search Report Issued Feb. 22, 2011 in PCT/JP10/73309 Filed Dec. 24, 2010.
U.S. Appl. No. 13/511,079, filed May 21, 2012, Takagi et al.

* cited by examiner

*Primary Examiner* — James Mackey
(74) *Attorney, Agent, or Firm* — Oblon, Spivak, McClelland, Maier & Neustadt, L.L.P.

(57) ABSTRACT

A tire vulcanizing device includes a plurality of opening/closing cylinders for respectively independently moving a plurality of mold holding members, which respectively hold a plurality of segmented molds arranged in a circumference direction, forward and backward in radial directions, a plurality of positioning blocks arranged in respective spaces in the circumferential direction between the plurality of segmented molds, respective pairs of engaging members respectively provided at opposite sides of the respective mold holding members, and respective pairs of stopper members each pair of which are provided on the adjoining positioning blocks, for restricting the advanced end positions of the segmented molds in engagements with the respective pairs of engaging members.

4 Claims, 5 Drawing Sheets

US 8,485,806 B2

TIRE VULCANIZING DEVICE

TECHNICAL FIELD

The present invention relates to a tire vulcanizing device, and in particular, to a tire vulcanizing device capable of accurately positioning the positions that a plurality of segmented molds in a circumferential direction reach when closed.

BACKGROUND ART

In a tire vulcanizing device for manufacturing tires, as described in Patent Document 1, first of all, a green tire loaded to a loading/unloading position by a handling device or the like provided for the vulcanizing device is held by a bladder and is loaded inside a plurality of segmented molds in a circumferential direction which are in an open state, and then, the plurality of segmented molds are moved inward in the radial directions to be closed. Thereafter, the bladder is expanded by a pressure of steam or the like inside the green tire having been placed in the molds to enlarge the outer surface thereof in the space inside the green tire as the outer surface of the bladder is kept in close contact with the internal surface of the green tire to be pressed thereon, whereby the green tire is heated and pressurized between the segmented molds on the outer side and the bladder on the inner side. Further, upon completion of the vulcanizing process, the segmented molds are opened by being moved outward in the radial directions and, the vulcanized tire is taken out by the bladder from the molds.

PRIOR ART DOCUMENT

Patent Document
Patent Document 1: JP 2005-212462 A

SUMMARY OF THE INVENTION

Problem to be Solved by the Invention

In the tire vulcanizing device described in the aforementioned Patent Document 1, a mold closing member 15 formed with a slant surface 15a at an inner surface thereof are engaged through dovetail grooves with the outer circumferences of respective mold holding members 13 that respectively hold the segmented molds 12, and all of the mold holding members 13 in the circumferential direction are simultaneously moved in the radial directions (the opening/closing directions) when the mold closing member 15 is moved up and down.

In the tire vulcanizing device of this kind, the segmented molds are closed by the mold closing member until the adjoining segmented molds come to close contact with each other. Thus, the adjoining segmented molds are brought into collision with each other when the segmented molds are closed. This gives rise to a problem that the service lives of the segmented molds are shortened due to damage of the segmented molds.

The present invention has been made taking the foregoing problem in the prior art into consideration, and an object thereof is to provide a tire vulcanizing device which is capable of accurately positioning the positions that a plurality of segmented molds in a circumferential direction reach when closed and hence, of suppressing the damage of adjoining segmented molds caused by the collision therebetween.

Solution to the Problem

In order to solve the foregoing problem, the feature of the invention in the first aspect resides in that in a tire vulcanizing device wherein a plurality of segmented molds in a circumferential direction are movable forward and backward in radial directions, and wherein a vulcanizing process is performed with a bladder expanded in a green tire having been loaded inside the closed segmented molds, the device comprises a plurality of mold holding members respectively holding the plurality of segmented molds, a plurality of opening/closing cylinders for respectively independently moving the mold holding members forward and backward in the radial directions, a plurality of positioning blocks respectively provided in respective spaces in the circumferential direction between the plurality of segmented molds, respective pairs of engaging members provided at opposite sides of the respective mold holding members, and respective pairs of stopper members each pair of which are provided on the positioning blocks adjoining each other, for restricting advanced end positions of the segmented molds respectively in engagements with the respective pairs of engaging members.

The feature of the invention in a second aspect resides in that in the first aspect, either the respective pairs of stopper members or the respective pairs of engaging members are attached to either the positioning blocks or the respective mold holding members to be adjustable in positions in the moving directions of the mold holding members.

The feature of the invention in a third aspect resides in that in the first or second aspect, the respective pairs of stopper members are provided with respective stopper surfaces for restricting the advanced end positions of the respective segmented molds and respective slant surfaces for positioning the respective segmented molds in the circumferential direction and that the respective pairs of engaging members are provided with respective engaging surfaces for respectively engaging with the respective stopper surfaces of the pairs of stopper members and respective slant surfaces for respectively engaging with the respective slant surfaces of the pairs of stopper members.

The feature of the invention in a fourth aspect resides in that in the first or third aspect, shims are interposed between the respective pairs of stopper members and the positioning blocks and that the respective pairs of stopper members are attached to be adjustable in positions in the moving directions of the segmented molds by replacements of the shims.

Effects of the Invention

The invention in the first aspect comprises the mold holding members respectively holding the plurality of segmented molds, the plurality of opening/closing cylinders for respectively independently moving the mold holding members forward and backward in the radial directions, the plurality of positioning blocks respectively provided in the respective spaces in the circumferential direction between the plurality of segmented molds, the respective pairs of engaging members provided at the opposite sides of the respective mold holding members, and the respective pairs of stopper members each pair of which are provided on the positioning blocks adjoining each other, for restricting advanced end positions of the segmented molds respectively in engagements with the respective pairs of engage members. Thus, it is possible to operate the plurality of segmented molds independently, and by bringing the pair of the engaging members provided on each mold holding member into engagements with the pair of the stopper members provided on the positioning blocks, each segmented mold can be positioned to a predetermined position in the radial direction with itself held in an angular position where imaginary center line thereof intersects with a mold center line. As a result, it becomes possible to position the adjoining segmented molds to the mutual positions where they have a sight clearance of the degree that does not permit raw rubber to enter at the time of a vulcanization. Therefore, it is possible to suppress the damage of the segmented molds caused by the collision between the adjoining molds and hence, to increase the service lives of the segmented molds.

According to the invention in the second aspect, either the respective pairs of stopper members or the respective pairs of engaging members are attached to either the positioning blocks or the respective mold holding members to be adjustable in positions in the moving directions of the mold holding members. Therefore, through the position adjustments of each pair of the stopper members or each pair of the engaging members, it is possible to accurately position the advanced end positions of the respective segmented molds to desired positions at the time of a mold closing.

According to the invention in the third aspect, the respective pairs of stopper members are provided with the respective stopper surfaces for restricting the advanced end positions of the respective segmented molds and the respective slant surfaces for positioning the respective segmented molds in the circumferential direction, and the respective pairs of engaging members are provided with the respective engaging surfaces for respectively engaging with the respective stopper surfaces of the pairs of stopper members and the respective slant surfaces for respectively engaging with the respective slant surfaces of the pairs of stopper members. Thus, by bringing the respective slant surfaces on each pair of the engaging members into engagements with the respective slant surfaces on each pair of the stopper members, it is possible to restrict the position of each segmented mold in a direction (in the circumferential direction of the segmented mold) perpendicular to the radial direction. As a result, it is possible to enhance the positioning accuracy of the segmented molds in the directions perpendicular to the radial directions at the time of a mold closing.

According to the invention in the fourth aspect, the shims are interposed between the respective pairs of stopper members and the positioning blocks, and the respective pairs of stopper members are attached to be adjustable in positions in the moving directions of the segmented molds by replacements of the shims. Therefore, by replacing the shims, it is possible to easily adjust the positions in the radial directions of the respective segmented molds when the segmented molds are closed.

FORM FOR PRACTICING THE INVENTION

Figure 1:
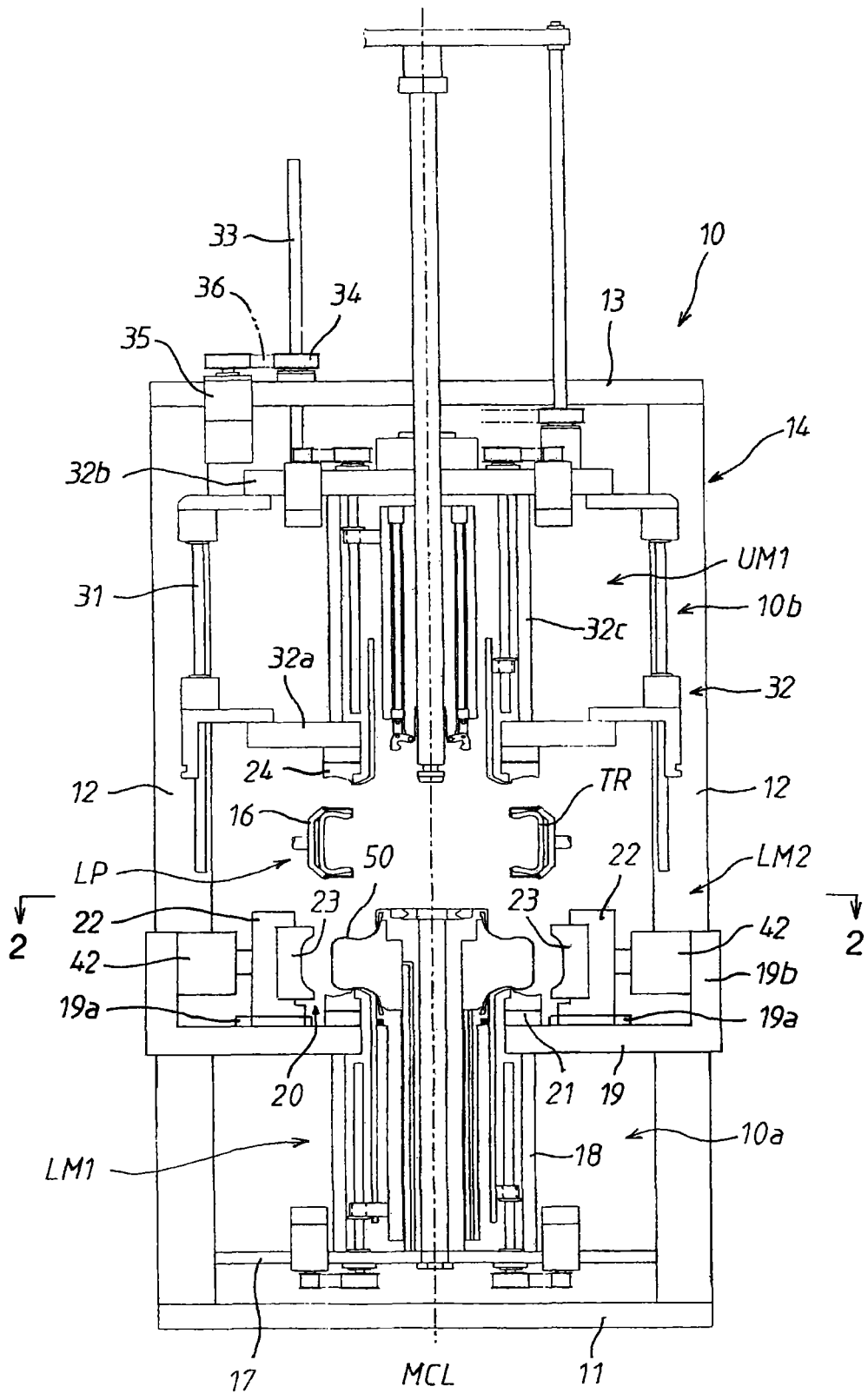
[FIG. 1] is a longitudinal sectional view showing the whole of a tire vulcanizing device in an embodiment according to the present invention.

A tire vulcanizing device in an embodiment according to the present invention will be described with reference to the drawings. In FIG. 1, numeral 10 denotes a tire vulcanizing device, and numeral 11 denotes a base plate of a circular shape or a rectangle shape as viewed in the plan view. The base plate 11 has four flames 12 including two flames (not shown) on a side over the drawing sheet which flames are upstanding at four corners of an imaginary square. The upper ends of the four flames 12 are connected by a top plate 13, and thus, the base plate 11, the flames 12 and the top plate 13 constitute a base framework 14 in the form of a vertically-long rectangular parallelepiped.

At a middle portion of the flames 12 in the vertical direction, there is defined a loading/unloading position LP with which a handling device 16 loads and unloads a green tire TR to be vulcanized. In the vulcanizing device 10, from the loading/unloading position LP taken as the center, all of the mechanical sections are partitioned into a lower mechanical section 10a arranged on the lower side and an upper mechanical section 10b arranged on the upper side to avoid the concentration of the mechanical sections on the lower side or the upper side of the flames 12, so that ease can be secured in maintenance, checking and servicing.

The lower mechanical section 10a has a mold support mechanism LM1 and an opening/closing mechanism LM2 for segmented molds. On the other hand, the upper mechanical section 10b has a support and opening/closing mechanism UM1 for an upper sidewall mold.

A mold base member 17 constituting the mold support mechanism LM1 is fixed to the flames 12 at the four corners. The mold base member 17 is composed of a cylindrical portion 18 extending vertically and a support table 19 of a hollow disc shape fixed on the upper end of the cylindrical portion 18. A lower mold device 20 is mounted on the support table 19.

The lower mold device 20 is composed of a lower sidewall mold 21 of a generally annular shape which is fixed concentrically with the center of the cylindrical portion 18, that is, a mold center line MCL being the center of the machine, a plurality (e.g., eight) of mold holding members 22 in the circumferential direction which are supported on the support table 19 to be movable forward and backward in radial directions, and a plurality (e.g., eight) of segmented molds 23 which are held on the inner sides of the mold holding members 22 and which are arranged about the mold center line MCL at equiangular intervals.

The segmented molds 23 take arc shapes respectively having specific arc lengths and are formed with tread forming surfaces on which a predetermined tread pattern is formed, at the center portions in the height direction of the internal surfaces thereof. Both end portions in the vertical direction of the segmented molds 23 are formed as arc surfaces which are able to fit closely on the outer circumferential surface of the lower sidewall mold 21 and the outer circumferential surface of an upper sidewall mold 24 referred to later.

Lower surfaces of the plurality of mold holding members 22 holding the segmented molds 23 are relatively movably engaged with guide rails 19a formed on the support table 19 in the radial directions, through dovetail-groove engagements. Thus, the mold holding members 22 are supported to be restrained from moving in the vertical direction relative to the support table 19 and are guided movably in the radial directions. The segmented molds 23 are able to be opened and closed by the opening/closing mechanism LM2 of the construction referred to later.

With respect to the upper mechanical section 10b, the support and opening/closing mechanism UM1 for the upper sidewall mold constituting an upper mold includes a movable frame 32 which is movable in the vertical direction along linear guide rails 31 laid on the frames 12. The movable frame 32 is composed of a support table 32a on the lower side supporting the upper sidewall mold 24, an upper plate 32b on the upper side, and a connection sleeve 32c bodily connecting the support table 32a and the upper plate 32b and arranged coaxially with the mold center line MCL. The upper plate 32b has fixed thereon a lower end portion of a screw shaft 33 extending in the vertical direction, and an upper portion of the screw shaft 33 extends upward through the top plate 13 and is engaged with a nut 34 which is rotationally supported on the upper surface of the top plate 13 through a thrust bearing (not shown). The nut 34 is rotationally connected to a servomotor 35 mounted on the top plate 13, through a pulley-belt mechanism 36. Thus, by driving the servomotor 35, the movable frame 32 is able to be positioned together with the upper sidewall mold 24 in the vertical direction, so that the upper sidewall mold 24 can be combined with the lower mold device 20.

Figure 2:
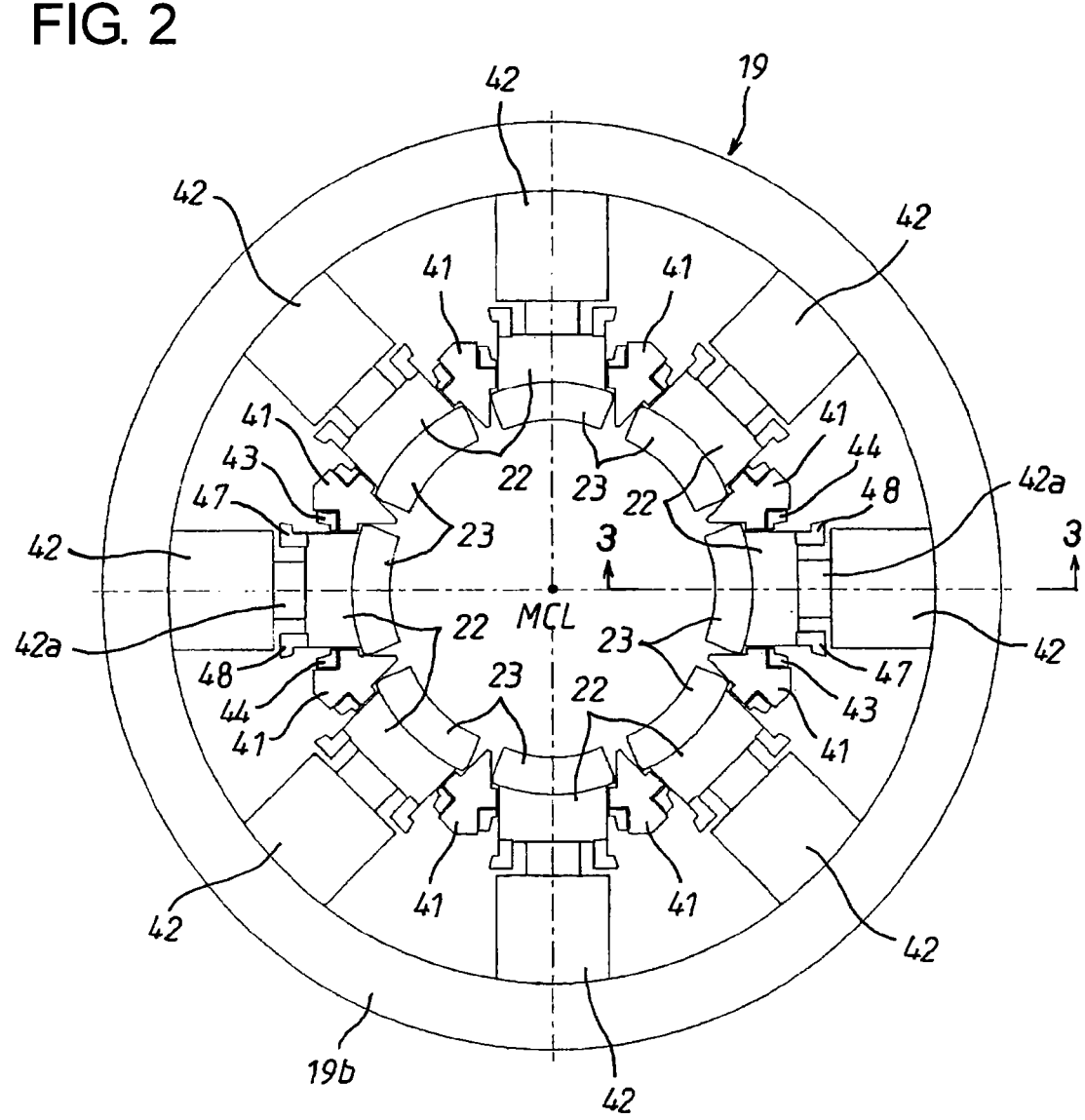
[FIG. 2] is a plan view of segmented molds as viewed along the line 2-2 in FIG. 1.
Figure 3:
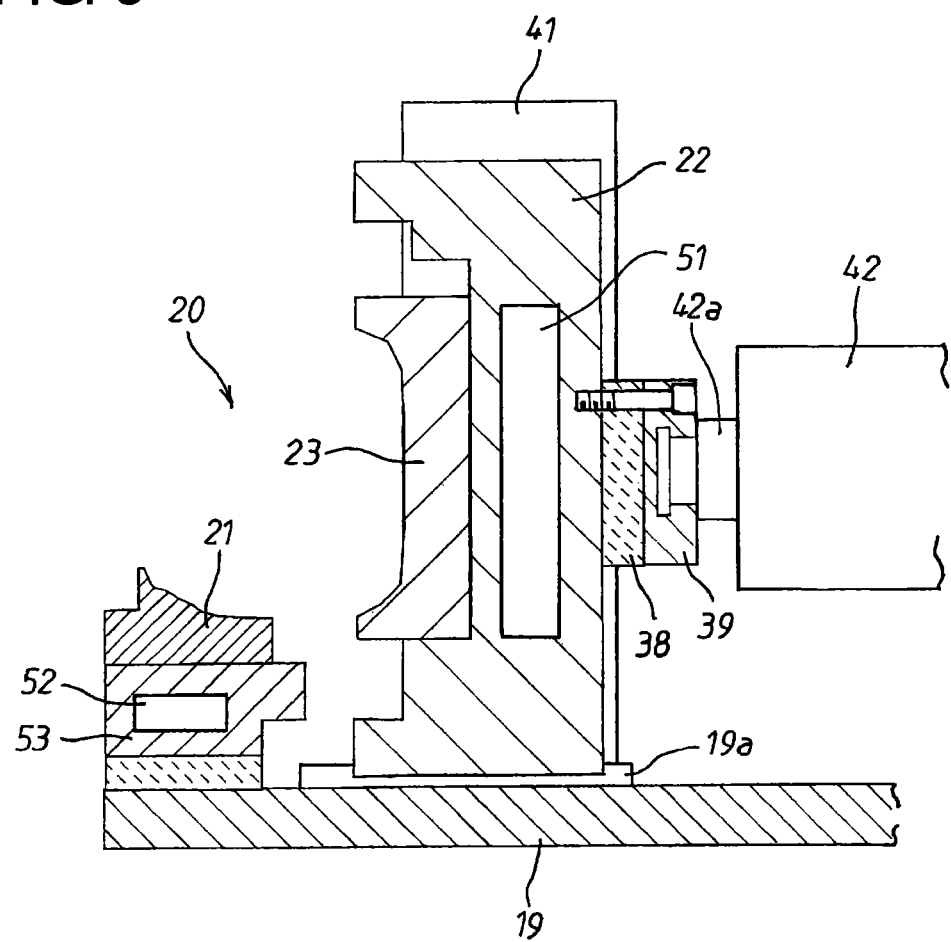
[FIG. 3] is a sectional view of the segmented mold taken along the line 3-3 in FIG. 2.

Next, with reference to FIGS. 2 and 3, description will be made regarding the specific construction of the opening/closing mechanism LM2 for opening and closing the segmented molds 23. On the support table 19, positioning blocks 41 being the same in number as the mold holding members 22 are arranged respectively in respective spaces in the circumferential direction between the plurality of mold holding members 22. The mold holding members 22 holding the segmented molds 23 are radially movably arranged in the respective spaces between the adjoining positioning blocks 41. Connection blocks 39 are fixed on rear end portions of the mold holding members 22 through heat insulators 38, and piston rods 42a of opening/closing cylinders 42 are respectively connected to these connection blocks 39. The opening/closing cylinders 42 are placed on an annual attaching portion 19b (refer to FIG. 1) formed on the support table 19 to be extendable respectively in the radial directions. Thus, the plurality of mold holding members 22 are moved forward and backward by the opening/closing cylinders 42 independently of one another.

Figure 4:
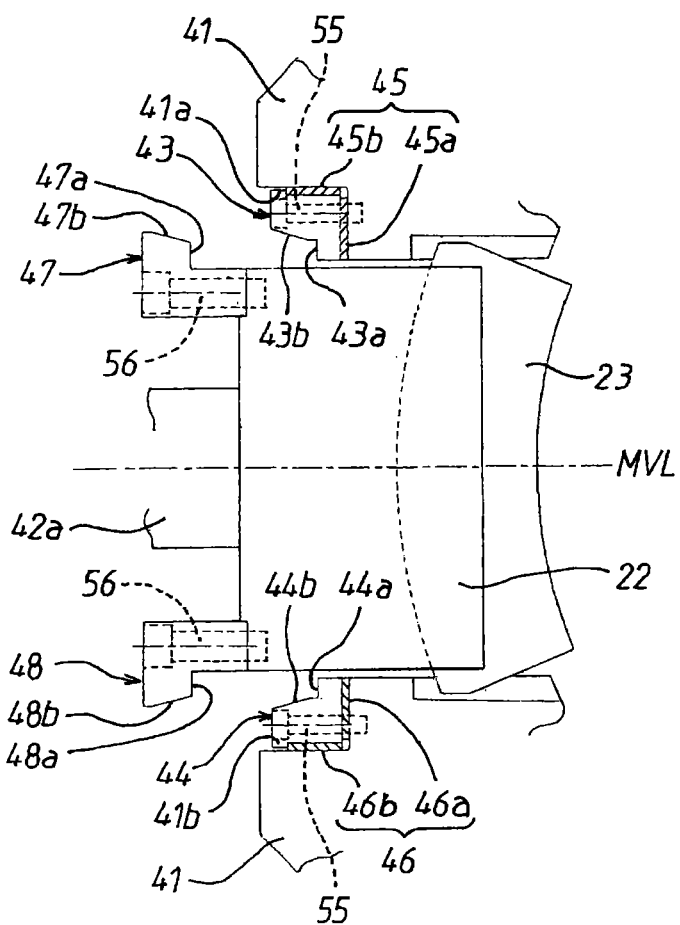
[FIG. 4] is an enlarged view enlarging a part in FIG. 2.

As shown in FIG. 4 in detail, cutout portions 41a, 41b are formed respectively at rear portions on mutually facing inner surfaces of the adjoining positioning blocks 41 of each pair, and a pair of stopper members 43, 44 are detachably fixed by bolts 55 respectively on these cutout portions 41a, 41b through shims 45, 46. The shims 45, 46 comprise first shims 45a, 46a for adjusting the attaching positions of the stopper member 43, 44 in the moving direction of the mold holding member 22 (in the radial direction of the segmented mold 23) and second shims 45b, 46b for adjusting the attaching positions of the stopper member 43, 44 in a horizontal direction (in the circumferential direction about the mold center line MCL) perpendicular to the moving direction of the mold holding member 22. The stopper members 43, 44 take an L-letter shape, and respective one ends in the radial direction of these stopper members 43, 44 are projected toward the inner side surfaces of the adjoining positioning blocks 41 of each pair to form stopper surfaces 43a, 44a. Further, at the respective other ends in the radial direction of the respective stopper members 43, 44, slant surfaces 43b, 44b are formed to face each other.

On the other hand, a pair of engaging members 47, 48 are bodily fixed by bolts 56 at opposite end portions of the rear end of each mold holding member 22. The pair of engaging portions 47, 48 take an L-letter shape, and respective one ends of these engaging members 47, 48 are projected from the opposite end portions of the mold holding member 22 toward opposite sides to form engaging surfaces 47a, 48a which are for respectively engaging with the stopper surfaces 43a, 44a of the stopper members 43, 44. Further, outside surfaces on the one ends of the respective engaging members 47, 48 are formed as slant surfaces 47b, 48b which are for respectively engaging with the slant surfaces 43b, 44b of the stopper members 43, 44.

The opening/closing mechanism LM2 is constructed as described above, and thus, when the plurality of mold holding members 22 are moved by the opening/closing cylinders 42 radially inward respectively in the radial directions, the respective slant surfaces 47b, 48b of the pair of engaging members 47, 48 provided on each mold holding member 22 are guided by the respective slant surfaces 43b, 44b of the pair of stopper members 43, 44 provided on the positioning blocks 41. Thus, each mold holding member 22 is engaged at the respective engaging surfaces 47a, 48a and the respective slant surfaces 47b, 48b of the pair of engaging members 47, 48 thereof with the respective stopper surfaces 43a, 44a and the respective slant surfaces 43b, 44b of the pair of stopper members 43, 44 as it is centered in the horizontal direction perpendicular to the advance/retraction direction, whereby the advanced end position of each mold holding member 22 is restricted.

Figure 5:
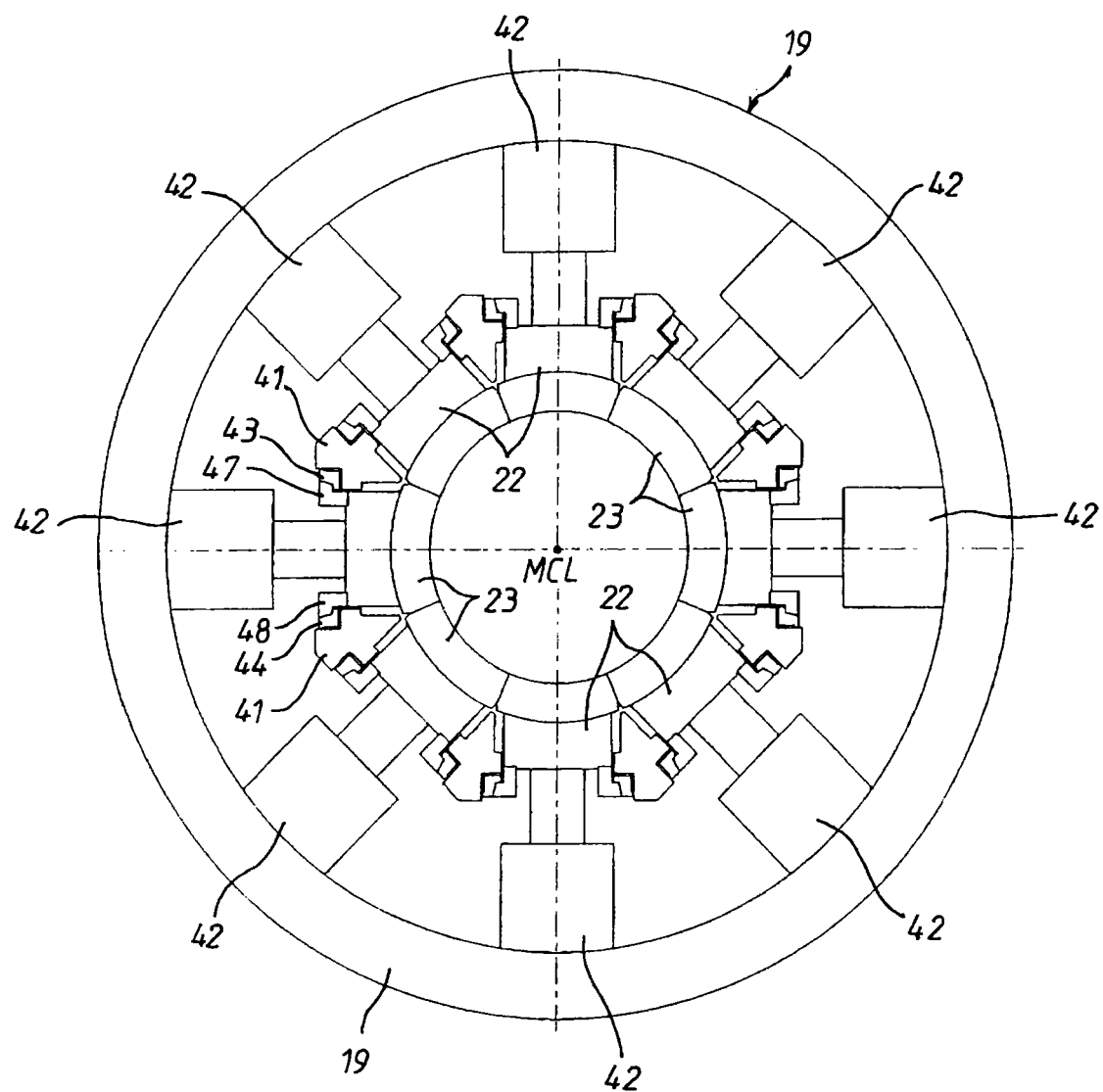
[FIG. 5] is an operational state view in FIG. 2, showing a closed state of the segmented molds.

Thus, since the positions of the segmented molds 23 held on the inner surfaces of the plurality of mold holding members 22 are restrained in the radial directions as well as in the circumferential direction, the internal surface formed by the plurality of segmented molds 23 is placed on a circle about the mold center line MCL to form the outer circumferential surface of a tire to be vulcanized, as shown in FIG. 5. That is, it is possible to bring the centers of the segmented molds 23 that are the curvature centers of the segmented molds 23 each forming an arc, all into agreement with the mold center line MCL.

In this case, unless the moving loci and the advanced end positions of the plurality of segmented molds 23 are set properly, the adjoining segmented molds 23 would collide with each other when the segmented molds 23 are closed, whereby the segmented molds 23 would be damaged to become short in service life. Further, for preventing the adjoining segmented molds 23 from colliding with each other at the time of the closing of the segmented molds 23, if it were tried to make a clearance between the adjoining segmented molds 23 in the state that the segmented molds 23 are closed, a part of the green tire TR would flow into the clearance between the segmented molds 23 when the green tire TR is vulcanized and formed, whereby the posttreatment subsequent to the vulcanizing and forming would become troublesome.

According to the present embodiment, on the contrary, when the plurality of segmented molds 23 together with the mold holding members 22 are moved by the opening/closing cylinders 42 radially inward respectively in the radial directions, the respective engaging surfaces 47a, 48a and the respective slant surfaces 47b, 48b of the pair of the engaging members 47, 48 provided on each mold holding member 22 are engaged with the respective stopper surfaces 43a, 44a and the respective slant surfaces 43b, 44b of the pair of stop members 43, 44 provided on the positioning blocks 41, respectively.

As a result that the respective engaging surfaces 47a, 48a of the pair of engaging members 47, 48 are engaged with the respective stopper surfaces 43a, 44b of the pair of stopper member 43, 44, the position of each segmented mold 23 at the advanced end is restricted in the radial direction, and the angular position of each segmented mold 23 is restricted within the horizontal plane. That is, each segmented mold 23 is positioned at an angular position where the curvature center thereof is in agreement with the mold center line MCL. Moreover, as a result that the respective slant surfaces 47b, 48b of the pair of the engaging members 47, 48 are engaged with the respective slant surface 43b, 44b of the pair of the stopper members 43, 44, the position of each segmented mold 23 is restricted in the direction perpendicular to the radial direction (in the circumferential direction of the segmented mold 23).

Thus, the positions of the respective segmented molds 23 in the radial directions are restricted with imaginary center lines MVL (refer to FIG. 4) of the molds held at angular postures each intersecting with the mold center line MCL. Therefore, at the advanced end positions of the mold holding members 22, the adjoining segmented molds 23 can be accurately positioned, in the relative positional relationship therebetween, to the positions where they have a sight clearance of the degree that does not permit raw rubber to enter at the time of the vulcanization.

This can be achieved by adjusting at the machine site the positions of the pairs of stopper members 43, 44 through replacements of the first shims 45a, 46a and the second shims 45b, 46b prior to the vulcanization of tires so that when closed with the mold holding members 22 positioned to the advanced end positions, the plurality of segmented molds 23 come to have, between those adjoining, the slight clearance of the degree that does not permit raw rubber to enter at the time of the vulcanization.

In FIG. 1, numeral 50 denotes an expandable/contractable bladder, and the bladder 50 holds a green tire TR loaded by the handling device 16 to the loading/unloading position LP and loads the tire TR inside the segmented molds 23 at a vulcanization position. Then, after the vulcanizing process, the vulcanized tire is unloaded by the bladder 50 from the vulcanization position to the loading/unloading position LP and is released from the bladder 50. Further, in FIG. 3, numerals 51, 52 denote steam chambers which are formed respectively in the plurality of mold holding members 22 holding the segmented molds 23 and in a mold holding member 53 holding the lower sidewall mold 21. Steam is supplied to these steam chambers 51, 52 to circulate therethrough, whereby the mold holding members 22, 53 are heated.

Next, description will be made regarding the operation of the vulcanizing device in the embodiment constructed as described above.

In the vulcanizing device 10 for manufacturing tires, the green tire TR is loaded by the handing device 16 or the like to the loading/unloading position LP and, the bladder 50 is inserted into the green tire TR from the lower side. Then, compressed gas is fed into the bladder 50, and the bladder 50 is expanded radially outward by the compressed gas to support the inner surface of the green tire TR. In this state, the green tire TR is moved downward together with the bladder 50 and is loaded inside the segmented molds (the segmented molds in the open state) 22 held on the mold holding members 22 which are separated on the support table 19 in the radial directions. Further, in the synchronized relation with this, the movable frame 32 is moved downward by the operation of the servomotor 35 to move the upper sidewall mold 24 downward to the position for combination. At this time, the lower surface of the support table 32a on the movable frame 32 is brought into a state to contact with the upper end surfaces of the mold holding members 22.

Then, the opening/closing cylinders 42 which are respectively connected to the plurality of mold holding members 22 in the circumferential direction are operated, whereby the respective segmented molds 23 are moved from the mold opening positions radially inward in radial directions to be moved to the mold closing positions as the upper and lower surfaces thereof are slidden on the lower surface of the support table 32a and the upper surface of the support table 19.

At this time, the respective slant surfaces 47b, 48b of the pairs of the engaging members 47, 48 provided on the mold holding members 22 moved by the opening/closing cylinders 42 forward in the radial directions are guided along the respective slant surfaces 43b, 44b of the pairs of the stopper members 43, 44 provided on the positioning blocks 41 on the support table 19. Thus, the mold holding members 22 and the segmented molds 23 are advanced as they are restrained from moving in the circumferential direction. Then, the respective engaging surfaces 47a, 48a and the respective slant surfaces 47b, 48b of the pairs of the engaging members 47, 48 are brought into engagements with the respective stopper surfaces 43a, 44a and the respective slant surfaces 43b, 44b of the pairs of the stopper members 43, 44. As a result, the advanced end positions of the mold holding members 22 are restricted.

With engagements of the respective engaging surfaces 47a, 48a of the pairs of engaging members 47, 48 with the respective stopper surfaces 43a, 44a of the pairs of the stopper members 43, 44, the mold holding members 22 are restricted in the radial positions at the advanced ends, and the respective segmented molds 23 are restricted in the angular positions within the horizontal plane.

Further, with engagements of the respective slant surfaces 47b, 48b of the pairs of engaging members 47, 48 with the respective slant surfaces 43b, 44b of the pairs of the stopper members 43, 44, the respective segmented molds 23 can be restricted in the positions in the direction (in the circumferential direction of the segmented molds 23) perpendicular to the radial directions. Thus, in the state that the imaginary center lines MVL of the respective segmented molds 23 are respectively held at angular postures intersecting with the mold center line MCL, the segmented molds 23 are positioned at angular positions where the curvature centers thereof are in agreement with the mold center line MCL.

As a result, as shown in FIG. 5, the inner circumferential surfaces formed on the plurality of segmented molds 23 come to the positions on a circle about the mold center line MCL to form the outer surface of a tire to be vulcanized. That is, the segmented molds 23 are closed to bring the centers of the segmented molds 23 that are the curvature centers of the segmented molds 23 each taking the form of an arc, all into agreement with the mold center line MCL.

In this manner, through the engagement actions of the respective engaging surfaces 47a, 48a and the respective slant surfaces 47b, 48b of the pairs of the engaging members 47, 48 with the respective stopper surfaces 43a, 44a and the respective slant surfaces 43b, 44b of the pairs of stopper members 43, 44, the adjoining segmented molds 23 can be restrained from interfering with each other when the plurality of segmented molds 23 in the circumference are moved toward the mold closing positions. Moreover, since the plurality of segmented molds 23 in the circumferential direction which have been moved to the mold closing positions are respectively positioned to predetermined positions in the radial directions as well as in the circumferential direction, the adjoining segmented molds 23 can be positioned to the respective positions where they have the slight clearance of the degree therebetween that does not permit raw rubber to enter at the time of the vulcanization, and the centers (the centers of curvatures) of the segmented molds 23 can be positioned to the positions that all come into agreement with the mold center line MCL. As a result, it does not occur that the adjoining segmented molds 23 are collided with each other to be damaged, so that the service lives of the segmented molds 23 can be maintained for a long period of time.

After that, heated vapor (for example, steam or heated inert gas) is supplied into the bladder 50 to enlarge the outer surface of the bladder 50 within the space inside the green tire TR as the bladder 50 is kept in close contact with the inner surface of the green tire TR to be pressed thereon, whereby the green tire TR is heated and pressurized by the segmented molds 23 and the like on the outer side and the bladder 50 on the inner side to be vulcanized and formed. Further, upon completion of the vulcanizing process, the segmented molds 23 are moved together with the mold holding members 22 radially outward to be opened, after which the vulcanized tire is taken out from the molds.

In the forgoing embodiment, the pairs of stopper members 43, 44 are attached to the positioning blocks 41 through the shims 45, 46, and the individual advanced end positions of the segmented molds 23 can be adjusted through the on-site adjustment by the replacements of the shims 45, 46. However, there may be taken a construction that the advanced end positions of the segmented molds 23 are adjusted by the position adjustments of adjusting bolts or the like instead of replacing the shims 45, 46. Further, position adjusting members such as the adjusting bolts, the shims or the like may be provided not on the positioning block 41 side, but on the mold holding member 22 side.

Further, in the forgoing embodiment, description has been made regarding the example wherein with the mold holding members 22 being at the advanced end positions, the plurality of segmented molds 23 are positioned to the positions where they have the slight clearances of the degree that does not permit raw rubber to enter. However, the adjoining segmented molds 23 may be positioned to the positions where they are slightly contacted with each other. In short, it suffices to position the respective segmented molds 23 so that the same do not collide with one another when the segmented molds 23 are closed.

Further, in the forgoing embodiment, description has been made regarding the example wherein each pair of the stopper members 43, 44 are provided with the respective stopper surfaces 43a, 44a for restricting the advanced end position of the segmented mold 23 and the respective slant surfaces 43b, 44b and wherein each pair of the engaging members 47, 48 are formed with the respective engaging surfaces 47a, 48a for respectively engaging with the respective stopper surfaces 43a, 44a of the pair of the stopper members 43, 44 and the respective slant surfaces 47b, 48b for respectively engaging with the slant surfaces 43b, 44b of the pair of stopper members 43, 44. However, where the guide accuracy in the radial directions of the mold holding members 22 which are engaged with the support table 19 through the dovetail grooves is enhanced by linear guides or the like, it is possible to restrict the positions of the segmented molds 23 in the direction (in the circumferential direction of the segmented molds 23) perpendicular to the radial directions, and hence, it is possible to omit the slant surfaces 43b, 44b, 47b, 48b of the stopper members 43, 44 and the engaging members 47, 48.

Further, in the forgoing embodiment, description has been made regarding the example wherein the plurality of segmented molds 23 in the circumferential direction are moved forward and backward by the opening/closing cylinders 41 simultaneously and independently. However, it is possible to move the plurality of segmented molds 23 in the circumferential direction forward and backward with a time difference. For example, in order for the adjoining segmented molds 23 not to be operated at the same time, it is possible to first move every other segmented molds 23 forward or backward and then move the remaining segmented molds 23.

As described above, the present invention is not limited to the forgoing embodiment and of course, may take various forms without departing from the gist of the present invention described in the claims.

Industrial Applicability

A tire vulcanizing device according to the present invention is suitable for one wherein a green tire is loaded inside a plurality of segmented molds and is vulcanized with the plurality of segmented molds closed.

The invention claimed is:

1. A tire vulcanizing device wherein a plurality of segmented molds in a circumferential direction are movable forward and backward in radial directions and wherein a vulcanizing process is performed with a bladder expanded in a green tire having been loaded inside the closed segmented molds, the device comprising:
   a plurality of mold holding members respectively holding the plurality of segmented molds;
   a plurality of opening/closing cylinders for respectively independently moving the mold holding members forward and backward in the radial directions;
   a plurality of positioning blocks respectively provided in respective spaces in the circumferential direction between the plurality of segmented molds;
   respective pairs of engaging members provided at opposite sides of the respective mold holding members; and
   respective pairs of stopper members each pair of which are provided on the positioning blocks adjoining each other, for restricting advanced end positions of the segmented molds respectively in engagements with the respective pairs of engaging members.

2. The tire vulcanizing device in claim 1, wherein either the respective pairs of stopper members or the respective pairs of engaging members are attached to either the positioning blocks or the respective mold holding members to be adjustable in positions in the moving directions of the mold holding members.

3. The tire vulcanizing device in claim 1, wherein:
   the respective pairs of stopper members are provided with respective stopper surfaces for restricting the advanced end positions of the respective segmented molds and respective slant surfaces for positioning the respective segmented molds in the circumferential direction; and
   the respective pairs of engaging members are provided with respective engaging surfaces for respectively engaging with the respective stopper surfaces of the pairs of stopper members and respective slant surfaces for respectively engaging with the respective slant surfaces of the pairs of stopper members.

4. The tire vulcanizing device in claim 1, further comprising:
   shims interposed between the respective pairs of stopper members and the positioning blocks;
   wherein the respective pairs of stopper members are attached to be adjustable in positions in the moving directions of the segmented molds by replacements of the shims.

* * * * *